United States Patent [19]

Mochida

[11] Patent Number: 4,761,645
[45] Date of Patent: Aug. 2, 1988

[54] KEYLESS ENTRY SYSTEM FOR AUTOMOTIVE DEVICES INCLUDING STEERING LOCK DEVICE WITH COMPACT, PORTABLE WIRELESS CODE TRANSMITTER

[75] Inventor: Haruo Mochida, Kanagawa, Japan

[73] Assignee: Nissan Motor Company, Limited, Yokohama, Japan

[21] Appl. No.: 706,281

[22] Filed: Feb. 27, 1985

[30] Foreign Application Priority Data

Mar. 1, 1984 [JP] Japan .................................. 59-39461

[51] Int. Cl.⁴ .............................................. H04Q 1/00
[52] U.S. Cl. ........................... 340/825.31; 340/825.32;
  340/825.34.825.61; 340/825.72; 361/172
[58] Field of Search ......................... 70/252, 256, 257;
  180/287; 307/10 AT; 340/572, 825.3, 825.31,
  825.32, 825.34, 825.69, 815.72; 361/171, 172

[56] References Cited

U.S. PATENT DOCUMENTS

| | | | |
|---|---|---|---|
| 3,168,737 | 2/1965 | Weinstein | 340/825.72 |
| 3,657,720 | 4/1972 | Avdenko et al. | 340/825.69 X |
| 3,732,465 | 5/1973 | Palmer . | |
| 3,891,980 | 6/1975 | Lewis et al. | 340/572 |
| 4,137,985 | 2/1979 | Winchell | 70/252 X |
| 4,205,325 | 5/1980 | Haygood et al. . | |
| 4,222,034 | 9/1980 | Orenzow | 307/10 AT X |
| 4,332,306 | 6/1982 | Turatti | 70/252 X |
| 4,509,093 | 4/1985 | Stellberger . | |
| 4,670,746 | 6/1987 | Taniguchi et al. . | |
| 4,672,375 | 6/1987 | Mochida et al. . | |
| 4,688,036 | 8/1987 | Hirano et al. . | |

FOREIGN PATENT DOCUMENTS

| | | |
|---|---|---|
| 0073068 | 3/1983 | European Pat. Off. . |
| 98437 | 1/1984 | European Pat. Off. . |
| 138090 | 4/1985 | European Pat. Off. . |
| 140137 | 5/1985 | European Pat. Off. . |
| 59-24075 | 2/1984 | Japan . |
| 2024914 | 1/1980 | United Kingdom . |

Primary Examiner—Ulysses Weldon
Attorney, Agent, or Firm—Foley & Lardner, Schwartz, Jeffery, Schwaab, Mack, Blumenthal & Evans

[57] ABSTRACT

A keyless entry system, is associated with a steering lock device. The steering lock device includes an electrically operated actuator for operating the steering lock device between locking and unlocking positions. Steering locking and unlocking operation is triggered by a predetermined vehicle operation, such as closing of the vehicular doors. A predetermined steering lock condition is checked as triggered the steering locking and unlocking operation. Steering locking and unlocking operation is carried out when the operation is triggered and the steering lock condition is satisfied.

9 Claims, 14 Drawing Sheets

KEYLESS ENTRY SYSTEM FOR AUTOMOTIVE DEVICES INCLUDING STEERING LOCK DEVICE WITH COMPACT, PORTABLE WIRELESS CODE TRANSMITTER

BACKGROUND OF THE INVENTION

The present invention relates generally to a keyless entry system for operating automotive vehicle devices such as door locks, a trunk lid lock, a glove box lid lock, a steering column lock and/or a starter motor, without using any mechanical keys, such as ignition key. More specifically, the invention relates to a keyless entry system which includes a compact, pocket-portable wireless code transmitter of a size comparable to a creditcard, and a feature for preventing the transmitter from being locked in the vehicle.

Conventionally, automotive door locks, trunk lid locks, glove box lid locks, steering lock devices and so forth have been operated by means of ignition or other mechanical keys. Recently, so-called "Keyless Entry Systems", which do not require keys to operate door locks, trunk locks, vehicle window regulators and so forth, have been developed. In such keyless entry systems, a keyboard is provided on the external surface of the vehicle body to allow entry of a preset code authorizing access to one of more desired vehicle devices. The designated vehicle devices are electrically operated when the entered code matches a preset code.

U.S. Pat. No. 4,205,325, to Haygood et al, discloses a keyless entry system for an automotive vehicle permitting a plurality of operations to be achieved from outside of the vehicle by one who is knowledgeable of preset digital codes. Functions such as unlocking the vehicle doors, opening the trunk lid, opening windows, operating the sun-roof or programming the system with a user-preferred digital access code can all be performed by proper sequential operation of a digital keyboard mounted on the outside of the vehicle.

This and other conventional keyless entry systems require the user to accurately input the preset code through the keyboard. Although such keyless entry systems have been well developed and considered useful for eliminating the need for mechanical keys, a serious problem may occur when the user of the vehicle forgets the preset code. If the user is outside of the vehicle and the vehicle door lock device is holding the door locked, the user cannot unlock the door lock until he remembers the preset code.

In order to resolve this defect in the prior art and allow convenient use of the keyless entry system, there has been proposed a new approach in which a pocket-portable wireless transmitter, of a size comparable to a creditcard and thus capable of being carried in clothing pockets, is used to identify users authorized to operate vehicle devices. This new keyless entry system has been disclosed in the Published Japanese Patent Application (Tokkai) Showa No. 59-24075, published on Feb. 7, 1984, (Japanese patent application No. 57-132118, filed on July 30, 1972). In the disclosed system, door locks, a trunk lid lock and so forth can be operated with a single push-button action. The wireless transmitter always becomes active in response to operation or depression of any one of the push buttons to operate a desired vehicle device. This means that whoever possesses the transmitter has full access to the vehicle and that whenever the transmitter is near enough to the vehicle, keyless entry is possible for any one at all. As a result, if the user should lock the transmitter in the vehicle and leave the vehicle, anyone would be able to unlock the door, turn on the starter motor and steal the vehicle. In addition, it would be highly likely for items stored in the trunk and/or glove box to be stolen when the transmitter is left in the vehicle.

In the prior system, we still require at least one stroke of a push button operation for operating each vehicle device. For instance, each one stroke of a push button operation is required for performing door locking, unlocking, steering locking or unlocking and so forth. To the contrary, the conventional mechanical key system allows automatic lock of steering by releasing the ignition key from the key cylinder.

SUMMARY OF THE INVENTION

Therefore, it is an object of the present invention is to provide a keyless entry system which facilitates automatic locking of steering when a predetermined steering lock condition is satisfied.

Another object of the invention is to provide a keyless entry system to operate vehicle devices including a steering lock mechanism without using any mechanical key.

In order to accomplish the above-mentioned and other objects, a keyless entry system, is associated with a steering lock device. The steering lock device includes and electrically operated actuator for operating the steering lock device between locking and unlocking positions. Steering locking and unlocking operation is triggered by a predetermined vehicle operation, such as closing of the vehicular doors. A predetermined steering lock condition is checked before triggering the steering locking and unlocking operation. The steering locking and unlocking operation is carried out when the operation is triggered and the steering lock condition is satisfied.

According to one aspect of the invention, a keyless entry system for an automotive vehicle for operating various vehicle devices including a door lock and a steering lock, comprises a portable wireless transmitter adapter to transmit a unique code indicative signal encoded to carry a preset unique code stored in the transmitter, actuators, each associated with corresponding vehicle devices for operating the latter to a desired state, the actuator including a steering lock actuator associated with the steering lock for operating the latter between a locking state and an unlocking state, manual switches, each adapted to trigger the controller for signalling the keyless entry system to operate a corresponding one of the vehicle devices, a first detector for detecting a door close position for outputting a first detector signal, a second detector adapted to detect a predetermined steering lock condition to output a second detector signal when the steering lock condition is detected, and a controller mounted on the vehicle and adapted to transmit a demand signal for triggering the transmitter and receiving the unique code indicative signal, comparing the received unique code with a second preset code, and producing a control signal only when the received unique code matches the second preset code. The controller is responsive to the first and second detector signal to transmit the control signal to the steering lock actuator for performing steering locking and unlocking operation.

BRIEF DESCRIPTION OF THE DRAWINGS

The present invention will be understood more fully from the detailed description given herebelow and from the accompanying drawings of the preferred embodiment of the present invention, which, however, should not be taken to limit the invention to the specific embodiment but are for explanation and understanding only.

In the drawings.

DESCRIPTION OF THE PREFERRED EMBODIMENT

Figure 1:
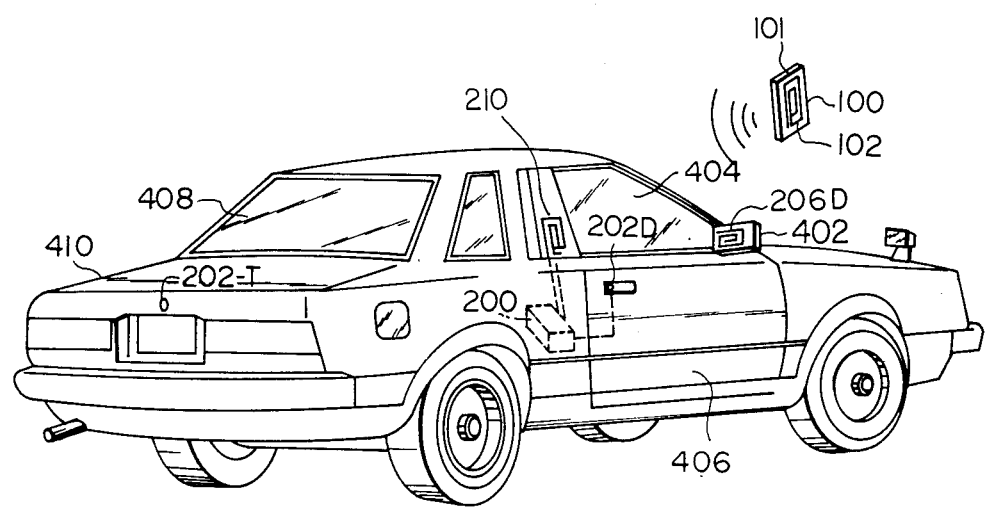
FIG. 1 is a perspective view of a vehicle to which a preferred embodiment of a keyless entry system in accordance with the present invention is applied.
Figure 2:
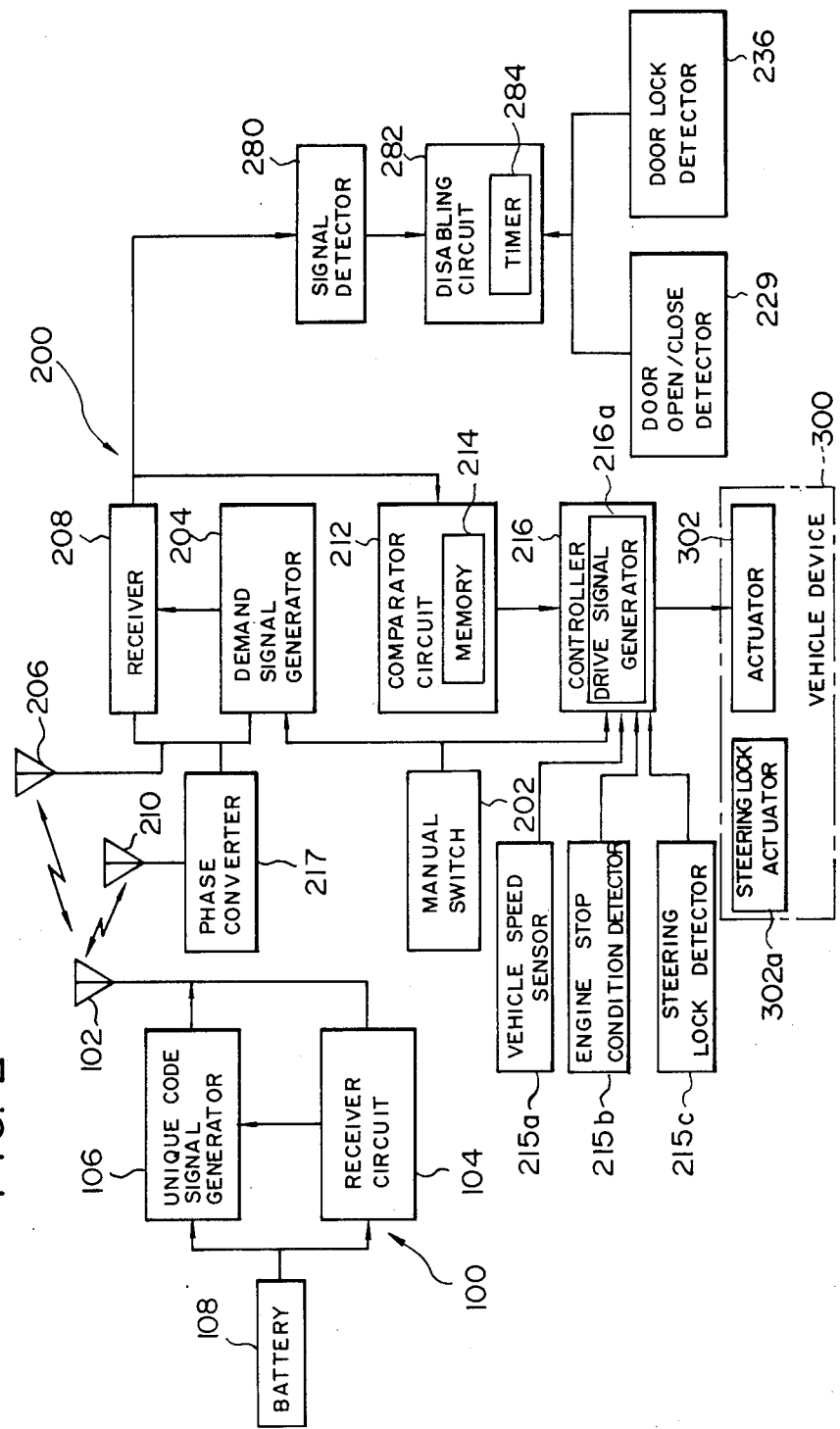
FIG. 2 is a block diagram showing the general circuit arrangement of the preferred embodiment of the keyless entry system according to the invention.

Referring now to the drawings, FIGS. 1 and 2 show the general structure of the preferred embodiment of a keyless entry system according to the present invention. As shown in FIG. 1, the preferred embodiment of the keyless entry system of the present invention generally comprises a compact wireless transmitter 100 which is comparable in size with common bank or creditcards and so can be easily carried in a clothing pocket, and a controller 200 mounted on a vehicle. The controller 200 is connected with push-button-type manual switches 202 mounted on the outer surface of the vehicle body. The manual switches 202 are each located near the corresponding vehicle devices 300. In order to facilitate keyless operation, each of the vehicle devices is associated with corresponding actuator 302. In the shown embodiment, the keyless entry system is designed to operate a door lock and a trunk lid lock. Therefore, the manual switch 202-D for the door lock is mounted on the vehicle door 406. On the other hand, the manual switch 202-T for the trunk lid lock is mounted on the trunk lid 410 or at an appropriate location near the trunk lid lock.

The shown embodiment of the keyless entry system is designed to automatically operate a steering locking mechanism which will be described later. The steering locking mechanism includes a steering lock actuator 302a.

The transmitter 100 has a thin, rectangular casing 101 on which a loop antenna 102 is provided. A loop antenna 206-D is mounted near enough the manual switch 202-D for the user to be able to depress the manual switch 202-D while holding the transmitter 100 within broadcast range of the loop antenna 206-D.

The fundamental idea of the present invention will be discussed with reference to FIG. 2. The manual switch 202 serves to request operation of the vehicle device 300. The controller 200 is responsive to depression of the manual switch 202 to produce a radio signal at a specific frequency which will be hereafter referred to as "demand signal". A demand signal generator 204 in the controller produces the demand signal in response to depression of the manual switch 202. The demand signal is transmitted by a transmitter antenna 206. The transmitter antenna 206 may be mounted on the external surface of the vehicle body near the vehicle device 300 to be operated. For example, if the vehicle device 300 to be operated were the left-front door lock, the transmitter antenna 206 might then be mounted on the window pane of the left-front door or on a mirror mounted on the left-front door. In practice, the transmitter antenna 206 will be a loop-antenna printed on the chosen area of the vehicle.

The transmitter 100 also has a transmitter/receiver antenna 102 which may be a loop-antenna printed on the outer surface of a transmitter casing. The antenna 102 is connected to a receiver circuit 104 of the transmitter 100 to receive the demand signal from the controller. The receiver circuit 104 is, in turn, connected to a unique signal generator 106 which generates a radio signal indicative of a unique combination of several digits in binary code. The radio signal produced by the unique signal generator 106 will be referred to hereafter as "unique code signal". The code indicated by the unique code signal is unique for each transmitter and serves to identify the transmitter 100. The unique code signal of the unique code signal generator 106 is transmitted by the antenna 102.

A receiver 208 with a receiver antenna 210 is provided in the controller to receive the uinque code signal from the transmitter 100. The receiver antenna 210 is also mounted on the external surface of the vehicle body near the transmitter antenna 206. The receiver 208 is connected to the demand signal generator 204 and responsive to the demand signal to be activated for a predetermined period of time. In other words, the receiver 208 is active for the predetermined period of time after the demand signal is transmitted. Signals received within the predetermined period of time are converted into binary code signals indicative of any and all digits encoded in the signal as they would be in the transmitter 100. The receiver 208 sends the converted binary code signal to a comparator circuit 212. The comparator circuit 212 includes a memory 214 storing a preset code which matches the unique code of the transmitter 100. The comparator circuit 212 compares the binary-coded digits from the receiver 208 with the preset code and produces a HIGH-level comparator signal when the codes match. A controller 216 including a driver signal generator 216a is responsive to the HIGH-level comparator signal produced by the comparator circuit 212 to produce a driver signal for an actuator 302 in the vehicle device.

In the shown embodiment, the controller 216 is adapted to detect a vehicle condition satisfying a predetermined steering lock condition. In the preferred embodiment, keyless steering lock operation is performed when the vehicle and engine are stopped as sensed by a speed sensor 215a and an engine stop condition detector 215b. The vehicle speed sensor 215a produces a vehicle speed indicative signal. On the other hand, the engine stop condition detector 215b is detective of an engine stopping condition to produce an engine stopping state indicative signal. The controller 216 is also connected to a steering lock detector 215c which produces a steering locking condition indicative signal.

In cases where the keyless entry system is adapted to operate more than one vehicle device, the controller 216 is also connected to the manual switches 202 so as to be able to operate the corresponding vehicle devices. The controller 216 recognizes which of the manual switches 202 is operated and sends a driver signal to the actuator of the corresponding vehicle device.

In the aforementioned arrangement, the transmitter 100 uses a small, long-life battery 108 as a power source. In practice, a mercury battery or its equivalent could be used in the transmitter. On the other hand, the controller 216 uses a vehicle battery as a power source. The aforementioned keyless entry system according to the present invention achieves conservation of battery power by being operative only when the manual switch is operated. It would be convenient to provide a weak battery alarm in the system. A suitable weak battery-alarm feature for a keyless entry system has been disclosed in the co-pending U.S. patent application Ser. No. 651,783 filed on Sept. 18, 1984, commonly assigned to the assignee of the present invention. The disclosure of this co-pending U.S. patent application is hereby incorporated by reference.

The receiver 208 is also connected to a signal detector 280 which detects reception of the unique code signal from the transmitter 100. The signal detector 280 sends a detector signal to a disabling circuit 282 as long as the presence of the unique code signal is detected. The disabling circuit 282 is also connected to a door closure detector 229 and a door lock detecting switch 236. The disabling circuit 282 incorporates a timer 284 for measuring elapsed time from operation or depression of the one of the manual switches 202-D or 202-T. The disabling circuit 282 responds to the presence of the detector signal after a predetermined period of time, given that all of the doors are closed and locked as indicated by the door closure detector and the door lock detecting switch, to produce a disabling signal. The disabling signal disables production of the driver signal by the driver signal generator 216. On the other hand, while the driver signal generator 216 is disabled, the disabling circuit 282 is responsive to opening of one of the doors to stop the disabling signal and resume keyless entry operation.

In summary, a condition of the transmitter being locked in the vehicle is recognized when all of the doors are closed and locked and the unique code signal from the transmitter is received continuously for a period longer than a preset period of time. The preset period of time is determined empirically such that the period is long enough for the user to move out of transmission range but short enough that the user will still be able to hear the alarm indicating that the transmitter is about to be left in the vehicle. In order to enable the user to unlock the door in order to remove the transmitter from the vehicle, the system remains operative for a few minutes, which should be long enough for the user to return to the vehicle and to operate the manual switch for the door lock. If the user fails to notice the alarm and therefore does not operate the keyless entry system to unlock the door and remove the transmitter from the vehicle, the keyless entry system is rendered inoperative after those few minutes to inhibit keyless entry operation until the door is unlocked by means of a mechanical key.

This satisfactorily and successfully prevents the vehicle from being stolen by simple operation of the manual switch while the transmitter is in the vehicle.

The present invention will be described in more detail in terms of the preferred embodiment of the invention with reference to FIGS. 2 to 4.

Figure 3:
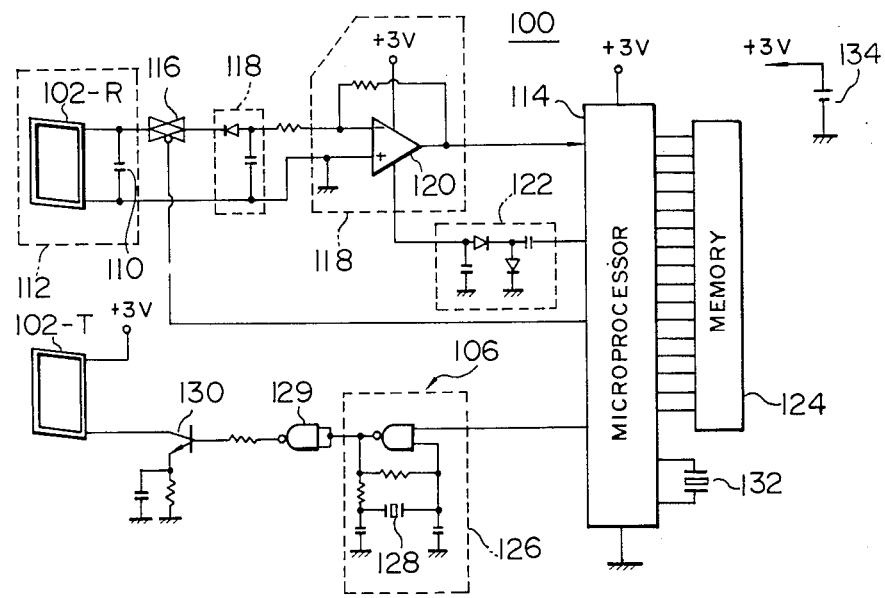
FIG. 3 is a schematic circuit diagram of a transmitter in the preferred embodiment of keyless entry system of FIG. 2.

As shown in FIGS. 2 and 3, as in the controller 200, the transmitter 100 is provided with a pair of loop antennas 102-R and 102-T which are printed on the outer surface of the transmitter casing (not shown). The antenna 102-R is connected to the receiver circuit 104 and serves as a receiver antenna. On the other hand, the antenna 102-T is connected to the unique signal generator 106 and serves as a transmitter antenna. A capacitor 110 is connected in parallel with the receiver antenna 102-R to form a passive antenna circuit 112. The antenna circuit 112 captures by electromagnetic induction the demand signal from the controller 200 produced in response to depression of one of the manual switches 202.

The antenna circuit 112 is connected to a microprocessor 114 via an analog switch 116, a detector circuit 118 and an amplifier 120. A negative power supply circuit 122 is inserted between an output terminal of the microprocessor 114 and the amplifier 120 to invert a 0 or +3 V binary pulse output from the microprocessor into a 0 to −3V input to the amplifier. This negative power is supplied to the amplifier to adjust the bias point of the amplifier to 0 V.

The microprocessor 114 is connected to a memory 124 storing the preset unique code. In practice, the memory stores four predetermined, four-bit, BCD digits. The memory 124 can be a ROM pre-masked with the preset code. However, in order to minimize the cost, it would be advantageous to use a circuit in the form of a printed circuit board including circuit elements corresponding to each bit. When the circuit element is connected, it is indicative of "1" and when the circuit element is cut or disconnected, it is indicative of "0". By this arrangement, the preset code may be input simply to the microprocessor 114.

The microprocessor 114 is adapted to be triggered by the demand signal from the controller 200, i.e., input to the microprocessor 114 through the antenna 102-R, the analog swtich 116, the detector circuit 118 and the amplifier 120 serves as the trigger signal for the microprocessor. In response to the trigger signal, the microprocessor 114 reads the peset unique code from the memory 124 and sends a serial pulse-form unique code signal indicative of the unique code to a modulator 126. The modulator 126 includes a crystal oscillator 128 for generating a carrier wave for the unique code signal. In the modulator 126, the unique code signal and the carrier wave are modulated into a radio signal in which the unique code signal rides on the carrier wave. The modulated radio signal is output through a buffer 129, a high-frequency transistor 130 and a transmitter antenna 102-T.

Another crystal oscillator 132 is connected to the microprocessor 114. The oscillator 132 may serve as a clock signals generator for feeding clock to the microprocessor.

In the above arrangement of the transmitter, electric power is supplied to each component by a small, long-life-type lithium cell 134 such as are used in an electronic watch. The microcomputer to be used for the transmitter 100 is of the low-voltage CMOS type. The analog switch 118 and the amplifier 120 IC units are also chosen to be of the power-saving type. As a result, stand-by operation requires only about 4 to 5 mA. This means that the transmitter 100 can be used for about one year before replacing the lithium battery.

Figure 4:
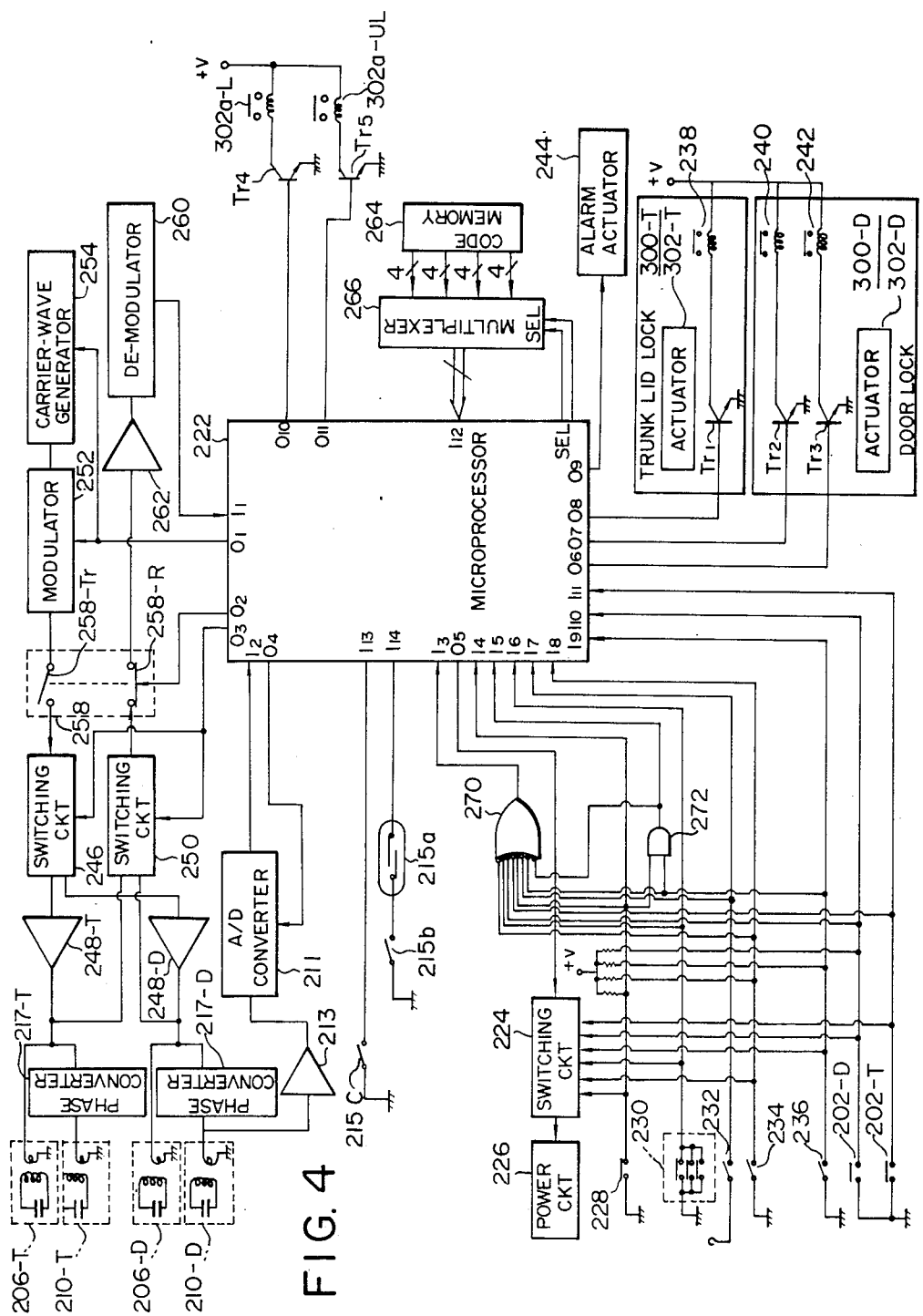
FIG. 4 is a schematic circuit diagram of a controller in the preferred embodiment of the keyless entry system of FIG. 2.
Figure 5:
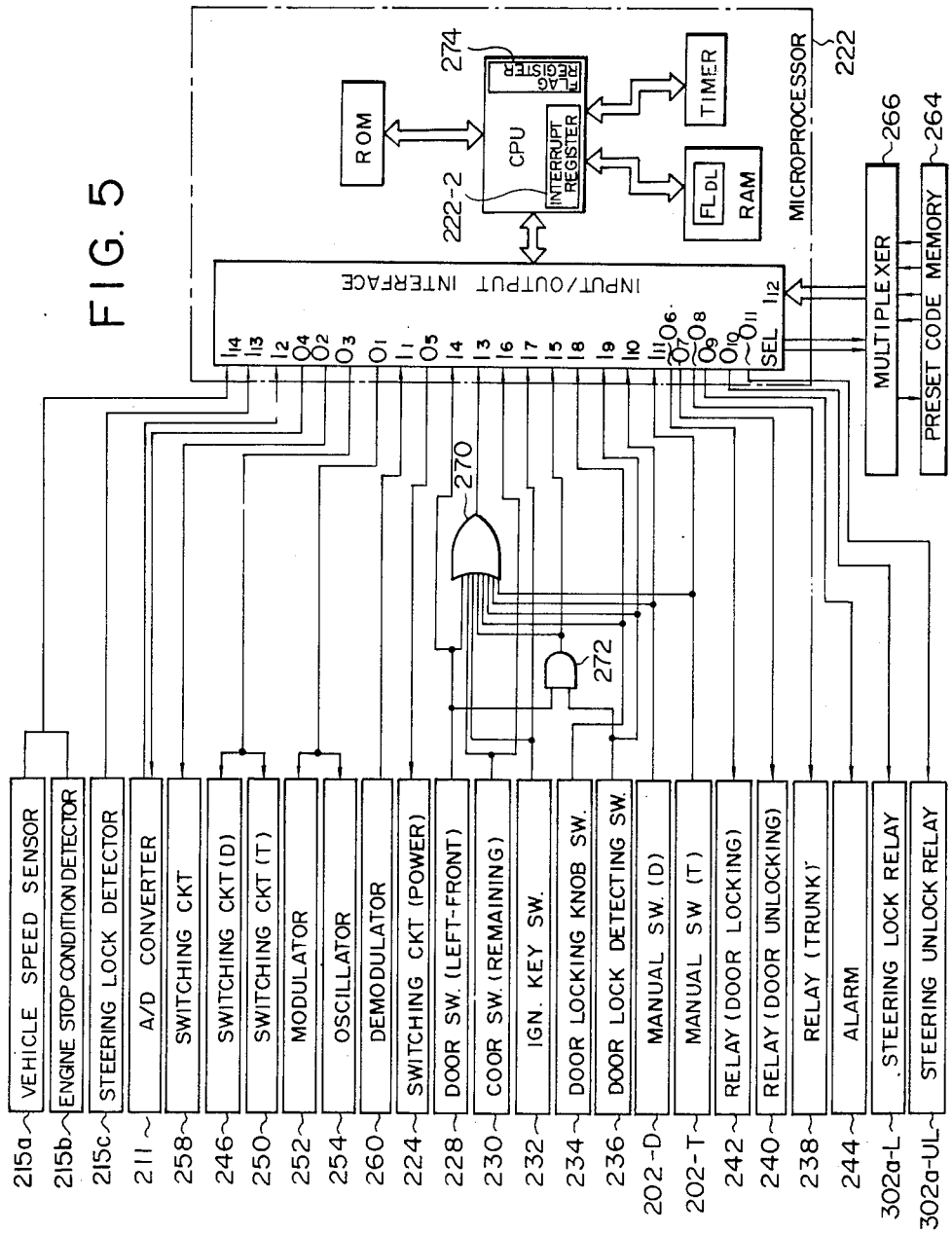
FIG. 5 is a block diagram showing details of a microprocessor in the controller of FIG. 4.

As shown in FIGS. 4 and 5, the controller 200 comprises a microprocessor 222 including an input/output interface, CPU, ROM, RAM, timer and so forth. The microprocessor 222 is connected to manual switches 202-D and 202-T. In the shown embodiment, the keyless entry system is designed to operate a door lock 300-D and a trunk-lid lock 300-T. Accordingly, the manual switch 202-D is connected to operate the door lock 300-D and the manual switch 202-T is similarly operable when the trunk lid lock 300-T is to be operated. The manual switches 202-D and 202-T are connected to the input terminals $I_9$ and $I_{10}$ of the microprocessor 222. The manual switches 202-D and 202-T are also connected to a switching circuit 224 inserted between the output terminal $O_5$ of the microprocessor 222 and a power supply circuit 226.

The switching circuit 224 is also connected to a driver's door switch 228, passenger door switches 230, an ignition key switch 232, a door lock knob switch 234 and a door-lock-detecting switch 236. The driver's door switch 228 detects opening and closing of the left-front door adjacent the driver's seat and is closed while the left-front door is open. The passenger door switches 230, detects opening and closing of the right-front door and the rear doors. These switches 230 close when the corresponding door opens. The door switches are built and operated as conventionally utilized for door closure monitoring. Alternatively, it would be simpler to connect the switching circuit 224 to conventional door switches.

The ignition key switch 232 is installed within or near an ignition key cylinder and detects the presence of an ignition key in the key cylinder. The ignition key switch 232 is closed while the ignition key is within the key cylinder.

The door lock knob switch 234 is responsive to a manual door locking operation by which the door lock of the driver's door is manually operated in the door-locking direction. The door lock knob switch 234 closes when the door lock knob is operated manually to perform door locking. The door lock detecting switch 236 detects the locking state of the door lock; specifically the switch 236 is closed while any of the door locks are unlocked and is open when all of the door locks are in their locking positions.

The switching circuit 224 is responsive to closure of any one of the switches 202-D, 202-T, 228, 230, 232, 234 and 236 to trigger the power supply circuit 226 for a given period of time. The power supply circuit 226 is active for the given period of time to supply a vehicle battery power to the various components of the controller circuit. In addition, the switching circuit 224 is responsive to high-level output from the output terminal $O_5$ of the microprocessor 222 to be held active and thus sustain operation of the power supply circuit 226 as long as the high-level output continues. The switching circuit 224 deactivates the power supply circuit when the output level of the output terminal $O_5$ drops from high to low.

The microprocessor 222 has input terminals in its input/output interface to be connected to the driver's door switch 228, the passenger door switch 230, the ignition key switch 232, the doorlock knob switch 234 and a door-lock-detecting switch 236. Also, the microprocessor 222 is connected to the steering lock detector 215c, the engine stop condition detector 215b and the vehicle speed detector 215a.

Output terminals $O_8$, $O_7$ and $O_6$ of the microprocessor 222 are respectively connected to actuator relays 238, 240 and 242 via switching transistors $Tr_1$–$Tr_3$. The actuator relay 238 is associated with an actuator 302-T of the trunk lid lock 300-T. The actuator relays 240 and 242 are associated with an actuator 302-D of the door lock 300-D. In practice, the actuator 302-D comprises a reversible motor which actuates the doorlock 300-D to its locked position when driven in one direction and to its unlocked position when driven in the other direction. Two relays 240 and 242 are adapted to reverse the polarity of power supply and thus switch the driving direction of the reversible motor. For instance, when the relay 240 is energized, the reversible motor 302-D is driven in the door-unlocking direction. On the other hand, when the relay 242 is energized, the reversible motor 302-D is driven in the door-locking direction. Therefore, the output level at the output terminal $O_7$ goes high when the door is to be unlocked and the output terminal $O_6$ goes high when the door is to be locked.

In addition, the microprocessor 222 has another output terminal connected to a steering lock relay 302a-L and a steering unlock relay 302a-UL through switching transistors Tr4 and Tr5.

The microprocessor 222 is programmed to execute a theft-preventive operation in response to a specific condition. For example, if the the door switch is closed while the door lock detecting switch is open, a theft-preventive alarm signal is output via the output terminal $O_9$ which is connected to an alarm actuator 244. In practice, the alarm actuator 244 may be connected to a vehicular horn to activate the latter in response to the theft-preventive alarm signal. This theft-preventive operation in keyless entry systems has been disclosed in the European Patent First Publication No. 00 73 068, published on Mar. 2, 1983. The disclosure of this European Patent First Publication is herein incorporated by reference for the sake of disclosure. On the other hand, the theft-preventive operation could be performed by the microprocessor by counting erroneous operations within a given period of time. A theft-preventive procedure in which an alarm is generated after an excessive number of erroneous entry attempts has been disclosed in the co-pending U.S. patent application Ser. No. 651,784 filed by the common applicant and commonly assigned to the assignee of the present invention, which co-pending U.S. patent application is entitled "KEYLESS ENTRY SYSTEM FOR AUTOMOTIVE VEHICLE WITH POWER-CONSERVATION FEATURE". The contents of this co-pending U.S. patent application is hereby incorporated by reference for the sake of disclosure.

Figure 6:
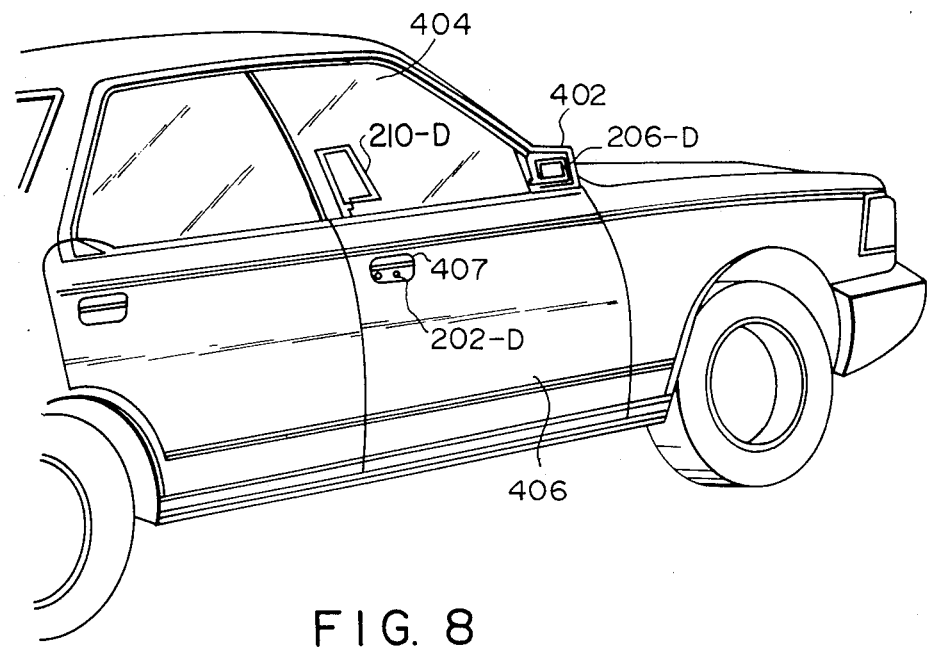
FIG. 6 is a perspective view showing a loop antenna mounted on the external surface of the vehicle body near a door lock.
Figure 8:
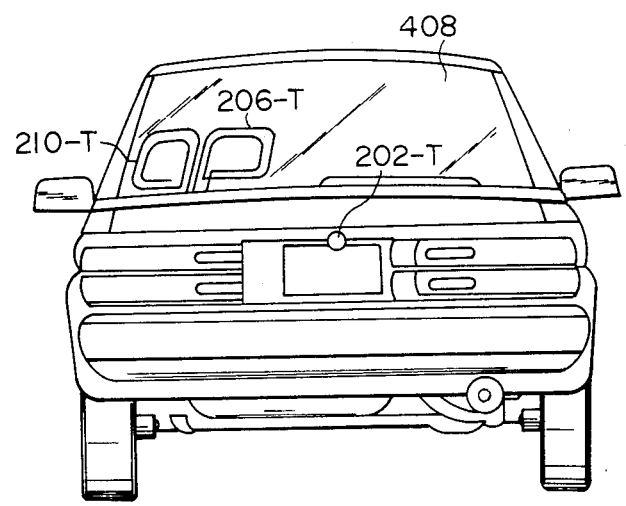
FIG. 8 is a rear view of a vehicle showing loop antennas mounted on a rear windshield near a trunk lik lock.

The antennas 206-D and 210-D in the shown embodiment are located near the door locks and the trunk lid locks. As an example, the antenna 206-D may be applied to or printed on the reflective surface of a door mirror 402, as shown in FIG. 6. The antenna 210-D may be applied to or printed on a window pane 404 of the vehicle side door 406. On the other hand, the antennas 206-T and 210-T are mounted near the trunk lid lock and may be applied to or printed on the rear windshield 408, as shown in FIG. 8.

Figure 7:
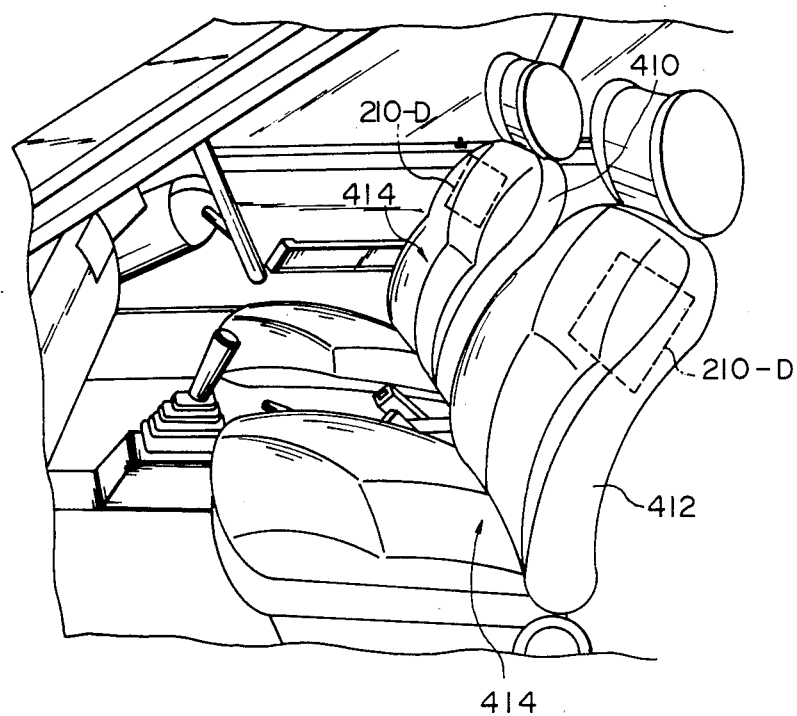
FIG. 7 is a perspective view of a vehicle showing loop antennas mounted on seat backs of front seats.
Figure 9:
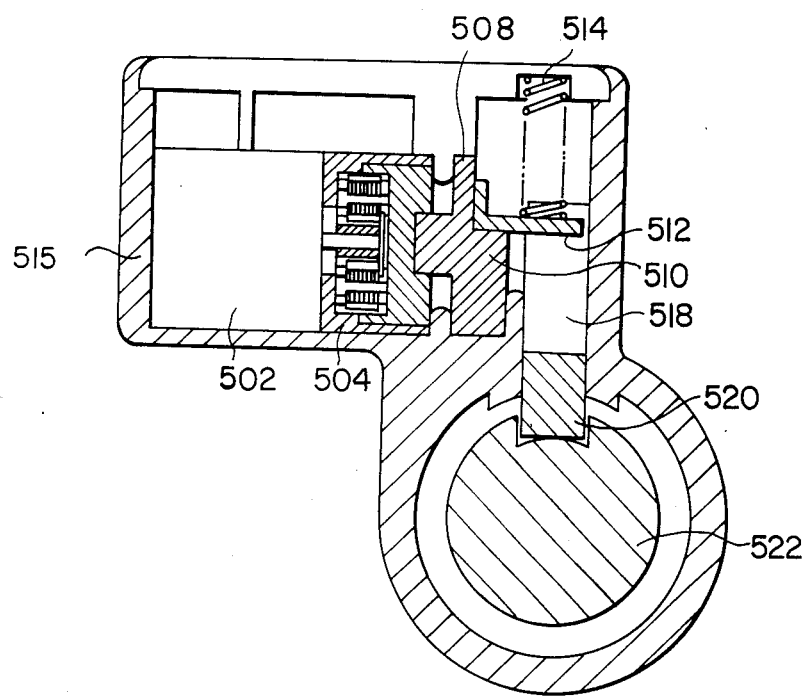
FIG. 9 is a cross-section of a steering lock device employed in the preferred embodiment of the keyless entry system according to the invention.
Figure 10:
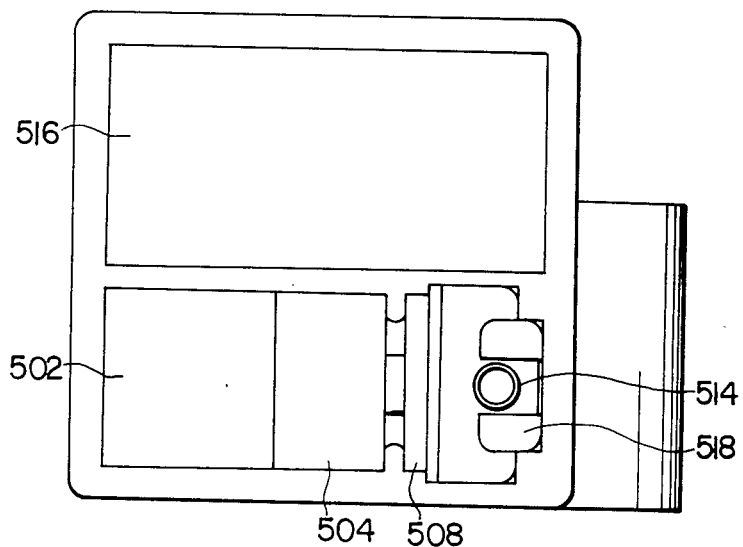
FIG. 10 is a plan view of the steering lock device of FIG. 9.
Figure 11:
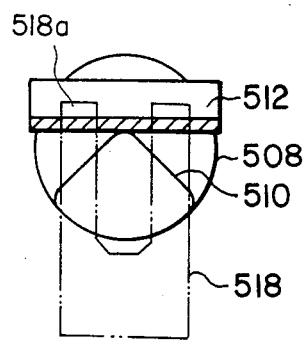
FIG. 11 is a side elevation of a locking rod in the steering lock device of FIG. 9.

As shown in FIG. 4, the antennas 206-D and 210-D are coupled to transmit the demand signal $S_{DM}$ and receive the unique code signal $S_{CM}$ when the door lock 300-D is to be operated. The antenna 210-D is connected to a phase converter 217-D which shifts the phase of the unique code signal received via the antenna 210-D through 90°. In this embodiment, the antenna 210-D is mounted on the seat back of a vehicle seat as illustrated in FIG. 7, instead of on the side door window pane.

The antenna 210-D is also connected to an analog-to-digital converter (A/D converter) 211 through a high-frequency amplifier 213. The A/D converter 211 outputs a digital signal $S_{Rf}$ indicative of the received signal level to the input terminal $I_2$ of the microprocessor 222. The A/D converter 211 is also connected to the output terminal $O_4$ of the microprocessor 222 and is gated by a trigger signal output through the output terminal $O_4$. Similarly, the antennas 206-T and 210-T are coupled to transmit the demand signal to the transmitter 100 and receive the unique code signal in return when operation of the trunk lid lock is requested via the manual switch 202-T. The antenna 210-T is connected to a phase converter 217-T which shifts the unique code signal phase received by the antennas 210-T through 90°.

The pairs of antennas 206-D, 210-D and 206-T, 210-T are connected for input from a switching circuit 246 through respectively corresponding high-frequency amplifiers 248-D and 248-T. The switching circuit 246 selectively activates one pair of antennas 206-D, 210-D or 206-T, 210-T to transmit the demand signal $S_{DM}$. For instance, when the manual switch 202-D is depressed to produce the demand signal $S_{DM}$ for operating the door lock 300-D, the antennas 206-D and 210-D become active to transmit the demand signal to the transmitter. The signal phase of the demand signal transmitted through the antenna 210-D is shifted through 90° by means of the phase converter 217-D. On the other hand, when the manual switch 202-T is depressed, the switching circuit 246 selects the antennas 206-T and 210-T. Similarly to the above, the demand signal $S_{DM}$ is thus transmitted to the transmitter through the antennas 206-T and 210-T and the signal phase of the demand signal transmitted through the antenna 210-T is shifted through 90° by the phase converter 217-T.

The switching circuit 246 is connected for input from a modulator 252 via a switch terminal 258-Tr of a switching circuit 258. The modulator 252 is, in turn, connected for input from the output terminal $O_1$ of the microprocessor 222. Similarly, the switching circuit 250 is connected to demodulator 260 through a switch terminal 258-R of the switching circuit 258 and an amplifier 262. The switch terminals 258-Tr and 258-R are adapted to alternate so that when the switch terminal 258-Tr is closed, the switch terminal 258-R is opened, and when the switch terminal-R is closed, the switch terminal 258-Tr is opened. When the switch terminal 258-Tr is closed, the controller 200 operates in transmitter mode to transmit the demand signal $S_{DM}$. On the other hand, when the terminal 258-R is closed, the controller 200 operates in receiver mode to receive the unique code-indicative signal from the transmitter 100.

The demodulator 260 is connected for output to the input terminal $I_1$ of the microprocessor 222.

The switching circuits 246 and 250 are connected to the output terminal $O_3$ of the microprocessor 222. The switching circuits 246 and 250 are operated in tandem to select one pair of antennas 206-D, 210-D or 206-T, 210-T. For instance, the switching circuit 246 connects the antennas 206-D and 210-D to the modulator via the switch terminal 258-Tr of the switching circuit 258 when the door lock operating manual switch 202-D is operated. At the same time, the switching circuit 250 connects the antennas 206-D and 210-D to the demodulator 260 through the switch terminal 258-R and the amplifier 262. Alternatively, when the trunk lid lock operating manual switch 202-T is operated, the switching circuit 246 connects the antennas 206-T and 210-T to the modulator 252 through the switch terminal 258-Tr and the switching circuit 250 connects the antennas 206-T and 210-T to the demodulator 260 via the switch terminal 258-R and the amplifier 262.

The modulator 252 is associated with an oscillator 254 which serves as a carrier-wave generator. The modulator 252 is triggered by the output at the output terminal $O_1$ of the microprocessor 222 to activate the carrier-wave generator 254 which then provides the fixed-frequency carrier wave. The modulator 252 modulates the carrier wave in accordance with the output from the output terminal $O_1$ to generate the demand signal $S_{DM}$ and then transmits same through the selected pair of antennas 206-D, 210-D or 206-T, 210-T. The demodulator 260 is adapted to separate the carrier wave component from the received unique code signal $S_{CD}$ so as to convert the radio signal into a binary signal representative of the unique code applies the encoded binary signal to the input terminal $I_1$ of the microprocessor 222.

The microprocessor 222 is triggered by the input at the input terminal $I_1$ via the demodulator 260 to read a preset code from a preset code memory 264 via a multiplexer 266. The microprocessor 222 compares the unique code with the preset code read from the preset code memory 264 to judge whether the transmitter 100 identified by the unique code corresponds to the controller 200 and so is authorized to operate the vehicle devices. The microprocessor 222 outputs a driver signal through one of the output terminals $O_6$, $O_7$ and $O_8$ corresponding to the operated manual switch so as to operate the correpsonding vehicle device, i.e. door lock or trunk lid lock, when the unique code matches the preset code.

It would be convenient for the preset code memory 264 to be an external memory connectable to the terminal of the multiplexer 266. In this case, the preset code memory 264 could be stored with the corresponding transmitter 100 as a separate unit. The preset code memory 264 and the transmitter 100 would be added to the vehicle upon sale so that the separate memory-and-transmitter unit would not be separated from the matching controller. In practice, the preset code memory is programmed by shorting some of a plurality of individual bit cells so as to have a binary output correpsonding to the unique code.

The switching circuit 258 is connected to the output terminal $O_2$ of the microprocessor 222 through which a state change-over signal is output. The state change-over signal is indicative of whether the system is transmitting the demand signal or receiving the unique code-indicative radio signal from the transmitter 100. In practice, the microprocessor 222 keeps the switching circuit 250 in the transmitting state for a given period of time in response to depression of one of the manual switches. Thereafter, the microprocessor 222 then switches the switching circuit 250 to the receiving state. Similarly to the switching circuit 246, the switching circuit 250 is connected to the output terminal $O_3$ of the microprocessor 222 to activate one of the antennas 210-D and 210-T according to which manual switch was depressed.

As will be seen from FIG. 4, the door switches 228 and 230, the ignition key switch 232, the door lock knob switch 234 and the door lock detecting switch 236 are respectively connected to the microprocessor 222 through input terminals $I_4$, $I_6$, $I_7$, $I_8$ and $I_5$.

FIGS. 9 to 14 show construction of the steering lock device which can be operated by the shown embodiment of the keyless entry system according to the present invention. The steering lock device generally comprises a steering lock motor 502 associated with a reduction gear assembly 504, and a rotor 508. The rotor 508 has a cam section 510 associated with a hunger 512 for vertically operating the latter. The hunger 512 is normally biased downwardly by means of a coil spring 514. A hollow space 516 is defined in a housing 515 of the steering lock device. A steering lock motor control circuit is housed in the hollow space 516 for controlling operation of the steering lock motor. The steering lock motor control circuit may include the steering lock relay 302a-L and the steering unlock relay 302a-UL. The steering lock relay 302a-L and the steering unlock relay 302a-UL are arranged to change the polarity of power supply for the steering lock motor 502 to drive the latter in a locking and unlocking direction.

Figure 12A:
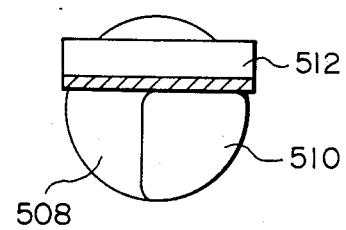
FIGS. 12A to 12C respectively show relationship of the locking rod of FIG. 11 and a rotor, in various operations positions.
Figure 12B:
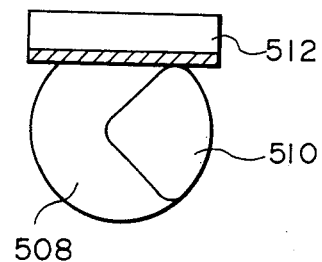
Figure 12C:
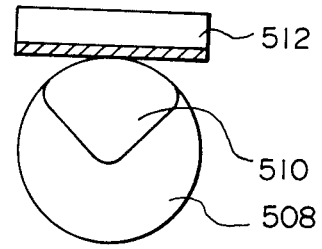
Figure 13:
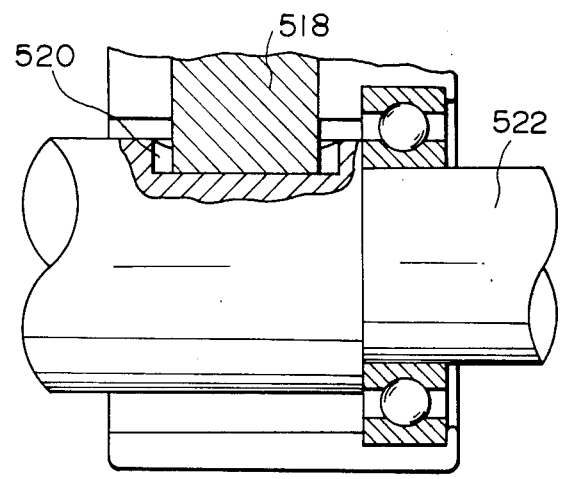
FIG. 13 is a section taken along line XIII—XIII of FIG. 9.

The hunger 512 is connected with a locking rod 518 which opposes a locking recess 520 formed in a steering shaft 522. The locking rod 518 has a bifurcated leg sections 518a through which it engages with the hunger 512 for vertical movement toward and away from the locking recess 520 together with the hunger. As set forth above, the cam section 510 is placed in contact with the hunger 512 to operate the latter together with the locking rod 518. According to rotation of the rotor 508 is driven by the steering lock motor 502, the hunger 512 and the locking rod 518 moved vertically as shown in FIGS. 12A to 12C. As will be appreciated, the hunger 512 is placed at the lowermost position in which the locking rod 518 engages the locking recess 520 of the steering shaft 522 for preventing the latter from rotating. On the hand, at the position of FIG. 12C, the hunger 512 with the locking rod 518 is positioned at the uppermost position. At this position, the locking rod 518 is positioned away from the locking recess 520 to allow free rotation of the steering shaft 522.

Though the specific construction of the steering lock device 302a has been disclosed hereabove for the sake of disclosure, the steering lock device is not necessarily restricted to the construction shown. Especially, though the construction shown will have one or more specific angular points to establish locking, it would be possible to modify the steering lock mechanism in various ways for locking at any angular position of the steering shaft.

Figure 14:
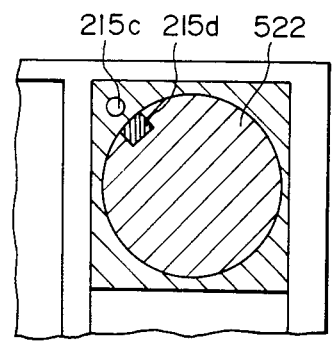
FIG. 14 is an explanatory illustration showing a steering lock detector in the keyless entry system.

FIG. 14 shows an example of the steering lock detector 215c. As will be appreciated herefrom, the detector 215c is provided adjacent the rotor 508. A permanent magnet 215d is mounted on the outer periphery of the rotor 508. The steering lock detector 215c is a kind of proximity switch detective of the magnet 215d adjacent thereto. The magnet 215d is so arranged on the periphery of the rotor 508 as to be placed adjacent the detector 215c when the rotor 508 is placed an angular position of FIG. 12A. The detector 215c is adapted to produce a high-level steering lock condition indicative signal when the locking engagement between the locking rod 518 and the locking recess 520 is established. On the other hand, the steering lock condition indicative signal is maintained at a low level as long as the locking engagement between the locking rod 518 and the locking recess 520 is not established and thus the detector 215c is positioned away from the magnetic 215d.

Figure 15:
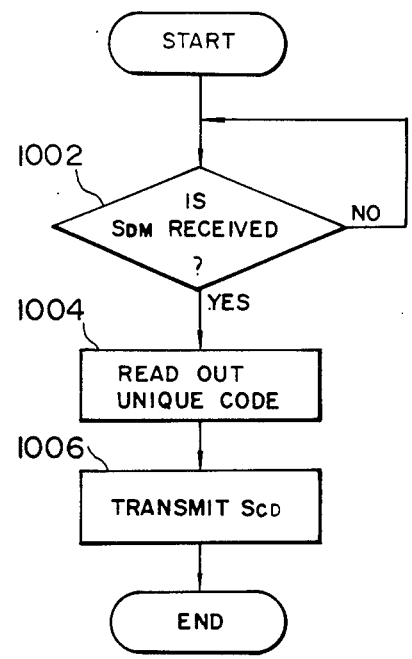
FIG. 15 is a flowchart of a program executed by a microprocessor in the transmitter of FIG. 3.

FIG. 15 illustrates the operation of the transmitter 100 in the form of a flowchart for a program executed by the microprocessor 114. The microprocessor 114 repeatedly executes the program of FIG. 15. In an initial block 1002 the microprocessor checks for reception of the demand signal SDM. Execution of the block 1002 loops until the demand signal SDM is received through the antenna 102. Upon receipt of the demand signal SDM at the block 1002, control passes to a block 1004. In the block 1004, the preset unique code is read from the code memory 124. At a block 1006, a carrier wave produced by a carrier-wave generator 128 is modulated by the unique code signal generator 106 in accordance with the retrieved code to produce the unique code signal. The modulated unique code signal SCD is then transmitted through the antenna 102 to the controller 200 mounted on the vehicle. As set forth above, according to the embodiment shown, the transmitter 100 is designed to consume minimal electric power, particularly during stand-by operation at the block 1002. This minimizes the drain on the battery and thus prolongs its lifetime.

Figure 16:
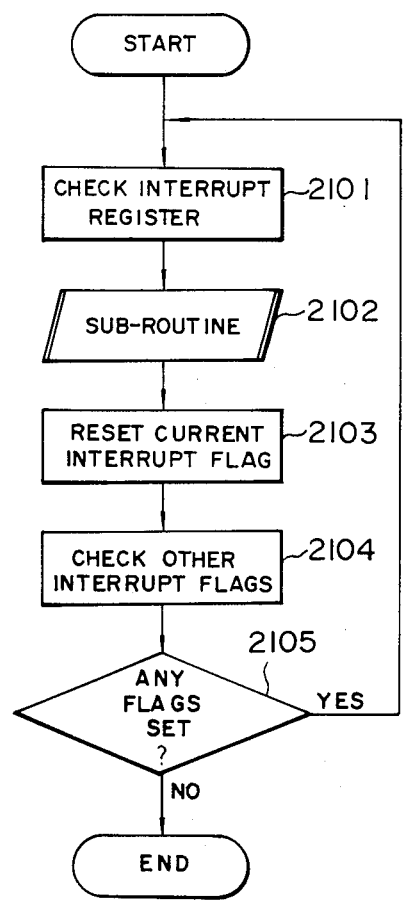
FIG. 16 is a flowchart of a main program to be executed by the microprocessor of the controller of FIGS. 4 and 5.
Figure 17:
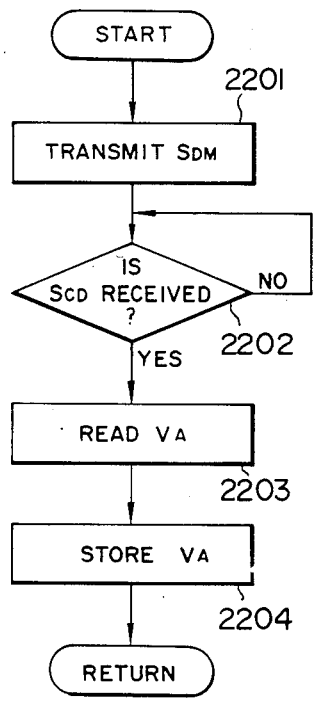
FIG. 17 is a flowchart of a first sub-routine of the main program of FIG. 16.
Figure 18:
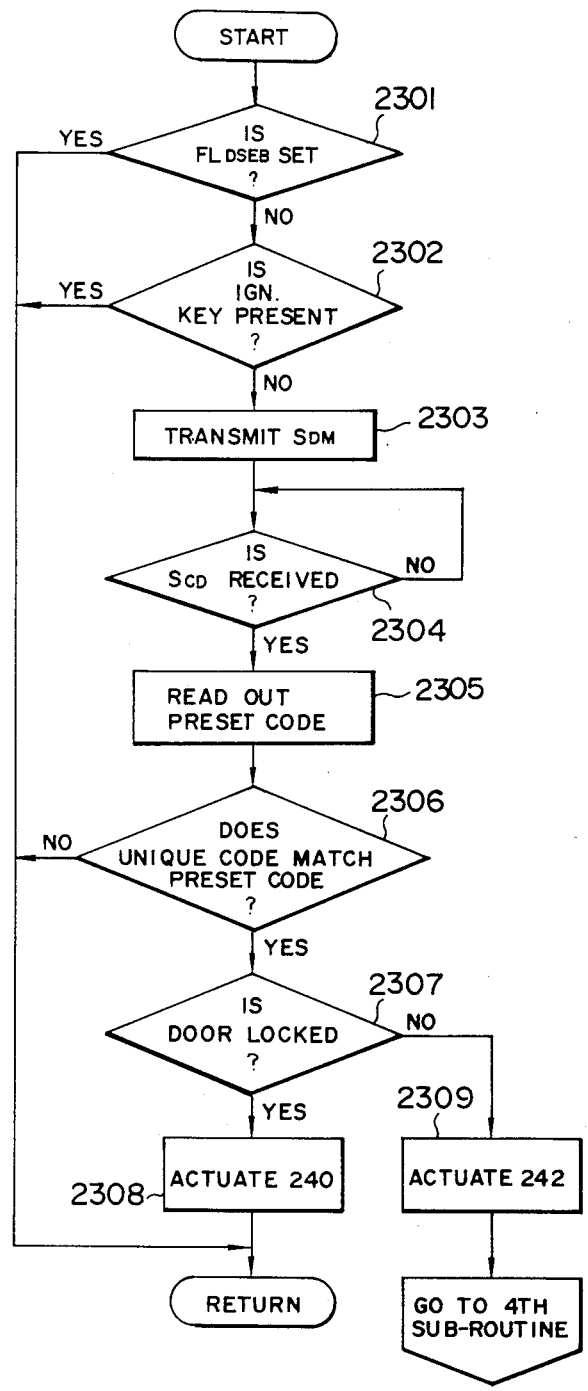
FIG. 18 is a flowchart of a second sub-routine of the main program of FIG. 16.
Figure 19:
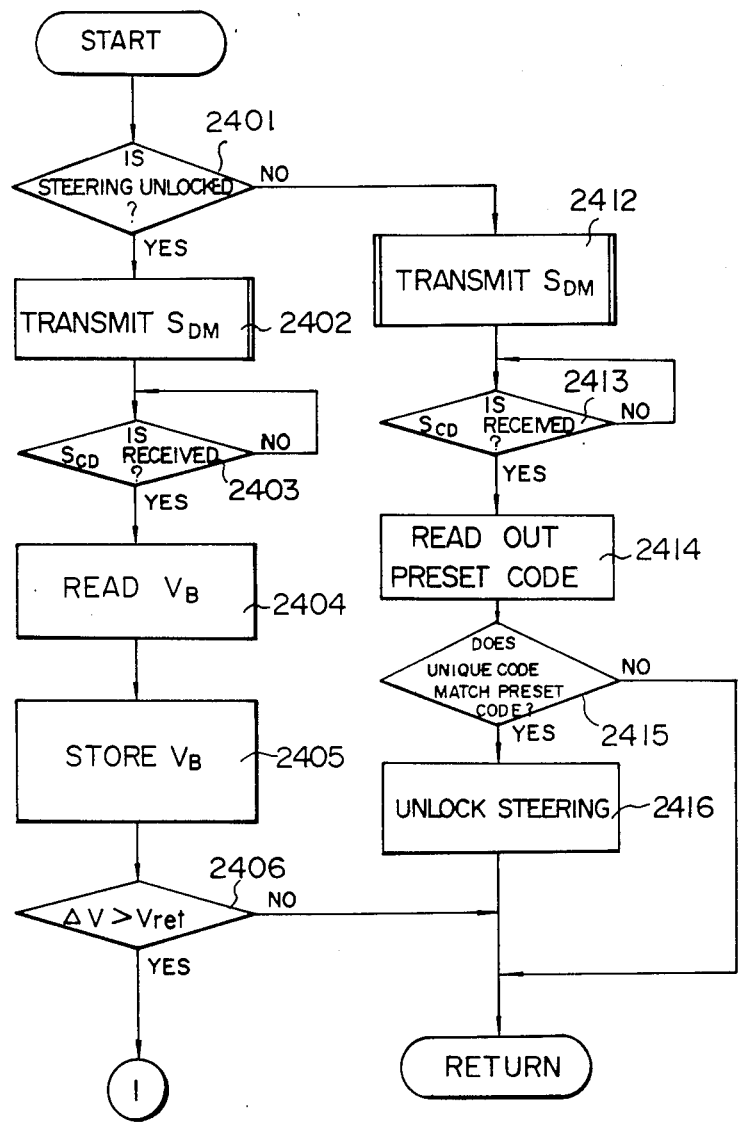
FIGS. 19 and 20 are flowchart of a third sub-routine of the main program of FIG. 16.
Figure 20:
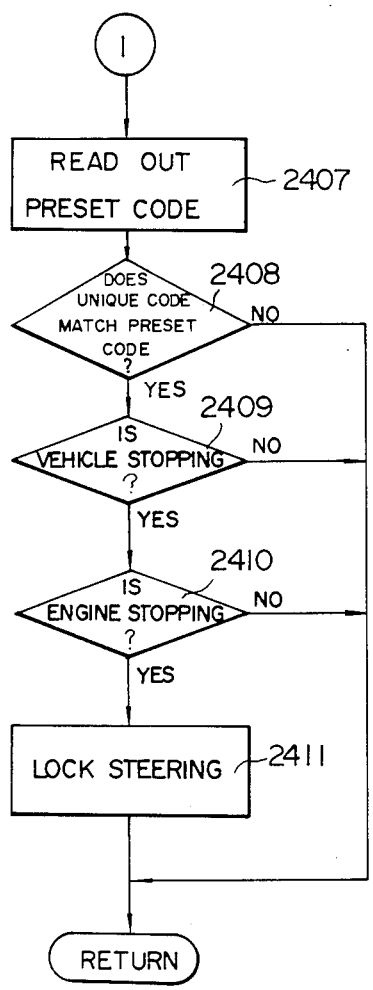
Figure 21:
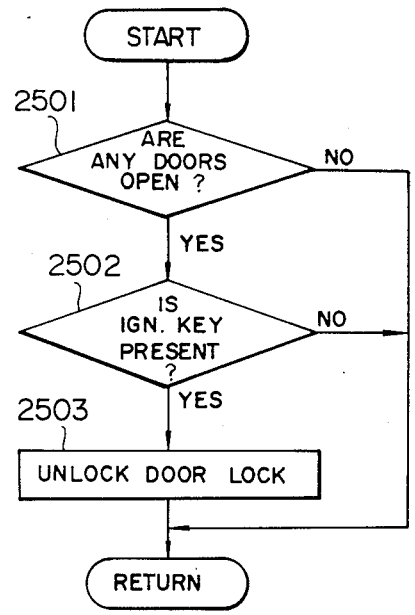
FIG. 21 is a flowchart of a fourth sub-routine of the main program of FIG. 16.
Figure 22:
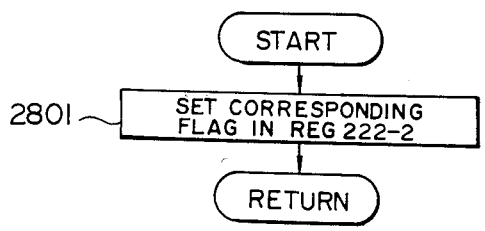
FIG. 22 is a flowchart of an interrupt program executed by interrupting execution of the main program and/or subroutines of FIGS. 16 to 21.

FIGS. 16 to 22 show the control program to be executed by the microprocessor 222 of the controller 200. FIG. 16 shows a flowchart of a main routine to be executed by the microprocessor 222, as a background job. The main routine of FIG. 16 is adapted to govern selection of various subroutines to be executed. FIG. 17 is a flowchart of a first subroutine to be triggered in response to opening of the door. FIG. 18 is a flowchart of a second subroutine to be executed in response to operation of the manual switch 202-D. FIGS. 19 and 20 show a sequence of a third subroutine to be triggered in response to closing of the door as detected by the driver's door switch 228. FIG. 21 is a flowchart of a fourth subroutine to be triggered by operation of the manual door lock knob. FIG. 18 shows an interrupt program to be executed in response to operation of one of the driver's door switch 228, the passenger door switch 230, the ignition key switch 232, the door lock knob switch 234 and the door lock detecting switch 236. Therefore, the interrupt program of FIG. 22 is triggered in response to a LOW-level input at the input terminal $I_4$.

The microprocessor 222 is also provided with a conventional interrupt register 222-2 (FIG. 5) consisting of flags indicative of occurrence of triggering inputs at each the input terminals $I_4$, $I_{10}$, $I_5$, $I_8$ and $I_9$ in order of priority or occurrence of input. The contents of the register 222-2 are checked in sequence during execution of the main program following the end of each subroutine. For instance, when the driver's door is closed, the input level at the input terminal $I_4$ goes low the interrupt flag in register 222-2 corresponding to the input terminal $I_4$ is set. This interrupt signalling method is per se well known and can be carried out in various ways. For example, as used in the preferred embodiments, interrupts may be either maskable, i.e. delayable until some other process in completed, or nonmaskable i.e. triggering immediate execution of an associated routine in preference to all other operations.

Similarly, when the door lock operating manual switch 202-D is operated, the input level at the input terminal $I_{10}$ changes from high to low. Then, the corresponding flag in the register 222-2 is set to reflect the triggering change in input level at the input terminal $I_{10}$ to signal execution of the second sub-routine. When the driver's door is opened and the door lock is operated to the locking position in preparation to locking the door, the door lock detecting switch 236 closes and the output signal from a series-connected AND gate 272 goes low. Thus, the input level at the input terminal $I_5$ goes low, where upon the third sub-routine of FIGS. 19 and 20 are executed. When the door lock is manually unlocked, the door lock knob switch 234 closes to change the input level at the input terminal $I_8$ to the low level. Then, the fourth sub-routine of FIG. 21 is executed in response thereto. When the all of the doors are locked and thus the door lock detecting switch 236 closes, the input level at the input terminal $O_9$ goes low to trigger the fifth sub-routine.

Concerning FIG. 16, at a block 2101 of the main program, the register 222-2 is checked to see if an interrupt request has been received via the input terminals $I_3$-$I_{11}$. If so, one of the sub-routines in FIGS. 17 to 21 is selected and executed at a block 2102 in accordance with the states of the flags in register 222-2.

After completing execution of the designated sub-routine the flag of register 222-2 corresponding to that routine is reset at a block 2103 and then, the contents of the interrupt register 222 are again checked at a block 2104 for later or lower priority interrupts requests yet to be handled. Thereafter, at a block 2105, control returns to block 2101 if there are any interrupt flags still set, indicating a request to execute another of the subsidiary routines illustrates in FIGS. 17-22. The loop 2101–2105 is repeated until there are no further flags set in interrupt register 222-2, whereupon the interrupt control program ends following block 2105, and control of the microprocessor 222 returns to its main program or operating system at the point following that at which the program of FIG. 16 interrupted execution.

The operation of the controller 200 during execution of each of the sub-routines of FIGS. 17 to 22 will be described in detail below.

FIG. 17 shows the first sub-routine to be executed when the driver's door is opened. Immediately after starting execution, the demand signal is produced and transmitted through the antennas 206-D and 210-D, at a block 2201. In order to select the antennas 206-D and 210-D, the output level at the output terminal $O_3$ remains low to connect the antennas 206-D and 210-D to the modulator 252 via the switch terminal 258-Tr of the switching circuit 258. At the same time, in order to operate the controller in the transmitter mode, the output level at the output terminal $O_2$ is held low to close the switch terminal 258-Tr and open the switch terminal 258-R. In response to a high-level output at the output terminal $O_1$, the modulator 252 is triggered to produce the demand signal $S_{DM}$ to be transmitted through the antennas 206-D and 210-D.

In response to the demand signal $S_{DM}$, the transmitter 100 becomes active to execute the foregoing program of FIG. 15 to transmit the unique code signal $S_{CD}$.

A block 2202 which checks for the unique code signal $S_{CD}$ is repeatedly performed until the signal $S_{CD}$ is received. During execution of the block 2202, the output level at the output terminal $O_4$ is held high to activate the A/D converter 211. After the unique code signal $S_{CD}$ is received at the block 2202, then the value $V_A$ input through the input terminal $I_2$ is read at a block 2203. The value $V_A$ is a binary signal digitalized by the A/D converter 211 and representative of the amplitude of the received unique code signal. Thereafter, the amplitude indicative value $V_A$ is stored in an appropriate memory block in RAM at a block 2204. Then, control returns to the control program of FIG. 16.

FIG. 18 shows the second sub-routine to be executed in response to a low-level input at the input switch 202-D. At an initial stage of execution of the second sub-routine, a disabling flag $FL_{DSEB}$ is checked at a block 2301, which disabling flag is set in a flag register 274 (FIG. 5) in the CPU when the controller 200 is disabled and is reset as long as the controller is enabled. If the disabling flag $FL_{DSEB}$ is set when checked at the block 2301, the routine of FIG. 18 ends immediately and control returns to the main program.

On the other hand, if the disabling flag $FL_{DSEB}$ is reset when checked at the block 2301, the presence of an ignition key (mechanical key) in the key cylinder (not shown) is checked for at a block 2302. In practice, the presence of the ignition key in the key cylinder is indicated by a high-level input at input terminal $I_7$ connected to the ignition key switch 232. If the input level at the input terminal $I_7$ is high, indicating that the ignition key is in the key cylinder, the user is judged to be in the vehicle. In this case, keyless entry operation is not to be performed and thus, control returns directly to the control program.

In the absence of the ignition key from the key cylinder the demand signal $S_{DM}$ is transmitted at a block 2303 in substantially the same manner as described with respect to the block 2201 of the first sub-routine. As set forth above, the transmission of the demand signal $S_{DM}$ continues for a predetermined period of time. The period for which the controller 200 remains in transmitter mode is defined by a timer 276 in the microprocessor 222. After the predetermined period of time expires, the output level at the output terminal $O_2$ changed from low to high in order to open the switch terminal 258-Tr and to close the switch terminal 258-R. As a result, electrical communication between the switching circuit 246 and the modulator is blocked and the switching circuit 248 establishes electrical communication between the demodulator 260 and the latter. This switching procedure for switching the operation mode of the controller 200 may also be used in the foregoing first sub-routine and the subsequent third and sixth routines which will be discussed later.

After switching the operation mode of the controller from the transmitter mode to receiver mode, reception of the unique code signal $S_{CD}$ from the transmitter is checked for at a block 2304. This block 2304 is repeated until the unique code signal $S_{CD}$ is received.

In practice, if the unique code signal $S_{CD}$ is not received within a given waiting period, the keyless entry system would be reset to prevent endless looping. In this case, a theft-preventive counter may be incremented by one and an alarm may be produced when the counter value reaches a given value. This alarm procedure has been disclosed in the aforementioned co-pending U.S. patent application Ser. No. 651,784. This reception-mode time limit procedure should, in practice, be applied to all routines which await reception of the unique code-indicative signal $S_{CD}$ from transmitter 100.

Upon reception of the unique code signal $S_{CD}$ at the block 2304, the preset code is retrieved from the code memory 264 through the multiplexer 266 at a block 2305. The recieved unique code is compared with the preset code at a block 2306. If the unique code does not match the preset code when compared in the block 2306, then the theft-preventing counter may be incremented by one as set forth above and control returns to the main program. On the other hand, if the unique code matches the preset code, then the input level at the input terminal $I_9$ is checked at a block 2307 to see if the door is locked or unlocked. If the input level at the input terminal $I_9$ is still high, indicating that the door is in locked, the control signal is then fed to the relay 240 to drive the reversible motor 302-D in the unlocking direction, at a block 2308. After this block 2308, control returns to the main program. On the other hand, when the input level at the input terminal $I_9$ is low when checked at the block 2307, then the relay 242 is energized at a block 2309 to drive the reversible motor 302-D in the locking direction.

After executing of the block 2309, control passes to the fourth sub-routine illustrated in FIG. 21. In the fourth sub-routine, an initial block 2501 checks to see if any of the the doors are open. In practice, this can be done by checking the input levels at the input terminals $I_4$ and $I_6$. If the input levels at the input terminals $I_4$ and $I_6$ are both high, indicating that all of the doors are closed, then control passes to a block 2502, in which the presence of the ignition key in the key cylinder is checked as in the block 2302 of the second sub-routine of FIG. 18. If the ignition key is in the key cylinder when checked at the block 2502, then the relay 240 is energized to drive the reversible motor 302-D in the unlocking direction at a block 2503. On the other hand, if none of the doors are open when checked at the block 2501 or if the ignition key is not in the key cylinder when checked at the block 2502, control simply returns to the control program.

FIG. 19 shows the third subroutine which is executed in response to the driver's door being closed and locked. At the initial stage of execution of the third subroutine, the steering lock indicative signal from the steering lock detector 215c is checked at a block 2401. When the steering lock indicative signal is held at a low level and thus the steering lock device in an unlocking state is recognized as checked in the block 2401, the demand signal $S_{DM}$ is transmitted at a block 2402. The demand signal $S_{DM}$ is maintained for a given period of time and terminated after expiration of the given period of time. Then, reception of the unique code signal $S_{dm}$ from the transmitter 100 is checked at a block 2403. At the same time, the A/D converter 211 is triggered via the output terminal $O_4$ of the microprocessor 222. After the unique code signal $S_{CD}$ is detected at the block 2403, the input value $V_B$ at the input terminal $I_2$ is read in at a block 2404. The input value at the input terminal $I_2$ is representative of the signal amplitude of the unique code signal. At subsequent block 2405, the amplitude indicative value $V_B$ is stored in an appropriate memory block in RAM. The signal amplitude indicative values $V_A$ and $V_B$ are retrieved and processed to derive their absolute difference $\Delta V$, which is then compared to a reference value $V_{ref}$ at a block 2406. If the difference $\Delta V$ is less than or equal to the reference value $V_{ref}$, then, process returns to the main routine. If desired, in advance of returning to the main routine, the alarm 244 may be triggered to produce an alarm.

On the other hand, when the difference $\Delta V$ is greater than the reference value $V_{ref}$, the preset code is read out at a block 2407. The read out preset code is compared with the input unique code at a block 2408. In the block 2408, a determination is made if the input unique code matches the preset code. When the input unique code does not matches the preset code, process returns to the main routine.

On the other hand, if the input unique code matches the preset code as compared in the block 2408, then the vehicle speed indicative signal from the vehicle speed detector is checked to make a determination if the vehicle is stopped, at a block 2409. When the vehicle is running and thus the vehicle speed indicative signal have a value representative of a vehicle speed other than zero, then process returns to the main routine. Alternatively, when the vehicle speed indicative signal value shows that the vehicle is stopped as checked at the block 2409, then, engine drive condition indicative signal from the engine stop condition detector 215b is checked at a block 2410. If the engine is running and thus the engine drive condition indicative signal has a value representing an engine running condition condition, the process returns to the main routine.

Alternatively, when engine stopping is detected as checked at the block 2410, a drive signal for energizing the steering lock relay 302a-L is output at a block 2411. By energization of the steering lock relay 302a-L, the steering lock motor 502 is driven in a steering locking direction to establish locking engagement between the locking rod 518 and the locking recess 520 of the steering shaft 522.

After operating the steering lock device to establish steering locking, the process returns to the main routine.

On the other hand, when the steering locking state is detected as checked at the block 2401 (FIG. 19), then process does to a block 2412 to output the demand signal $S_{DM}$. Similarly to the foregoing block 2402, the demand signal is maintained for the given period of time and terminates when the given period of time expires. Reception of the unique code signal SCD is checked at a block 2413. When reception of the unique code signal is detected as checked at the block 2413, the preset code in the controller is read out at a block 2414. The read out preset code and the input unique code are compared to each other for making a determination of whether the input unique code matches the preset code, at a block 2415. If the input unique code does not match the preset code, the process returns to the main routine. Alternatively, when the input unique code matches the preset code, a control signal is fed to the steering unlock relay 302a-UL to drive the steering lock motor 502 in a steering unlocking direction to release the locking engagement between the locking rod 518 and the locking recess 520 on the steering shaft 522 at a block 2416. After this operation, the process returns to the main routine.

FIG. 22 illustrates an interrupt signalling routine triggered by a high-level input at input terminal I₃. This routine consists of a single block 2801 in which the interrupt register flag corresponding to the triggering input source is set. Note that some conditions triggering a high-level input may not have corresponding interrupt flags. In practice, this routine may be performed automatically by hard-wired connections.

What is claimed is:

1. A keyless entry system for an automotive vehicle for selectively operating various vehicle devices including a door lock mechanism and a steering lock mechanism, comprising:
   a portable wireless transmitter adapted to transmit a unique code indicative signal encoded to carry a first preset unique code stored in said transmitter
   actuators, each associated with corresponding vehicle devices for operating the latter to a desired state, said actuators including a steering lock actuator associated with said steering lock mechanism for operating the latter between a locking state and an unlocking state;
   manual switches, manually operable for activating said keyless entry system and for signalling said keyless entry system to operate a corresponding one of said vehicle device; and
   a controller mounted on the vehicle and responsive to manual operation of at least one of said manual switches to transmit a demand signal for triggering said transmitter, and receiving said unique code indicative signal transmitted from said transmitter, said controller comparing the received unique code with a second preset code, and producing a control signal to be fed to one of said actuators corresponding to said at least one of said manual switches operated only when the received unique code matches said second preset code, for operating one of said vehicle devices corresponding to said at least one of said manual switches, said controller being detective of said transmitter moving out of a given transmission range from said vehicle to transmit said control signal to said steering lock actuator for performing a steering locking operation.

2. The keyless entry system as set forth in claim 1, further comprising a first detector which is detective of an engine stopped condition and produces a first detector signal when said engine stopped condition is detected, said controller further responsive to said first detector signal for transmitting said control signal to said steering lock actuator.

3. The keyless entry system as set forth in claim 1, further comprising a first detector which is detective of a vehicle stopped condition and produces a first detector signal when said vehicle stopped condition is detected, said controller further responsive to said first detector signal for transmitting said control signal to said steering lock actuator.

4. The keyless entry system as set forth in claim 1, further comprising a first detector which is detective of an engine stopped and a vehicle stopped condition and produces a first detector signal when the engine stopped and the vehicle stopped condition are both detected, said controller further responsive to said first detector signal for transmitting said control signal to said steering lock actuator.

5. The keyless entry system as set forth in claim 1, further comprising a first detector for detecting a door close position for outputting a first detector signal and wherein said controller receives said first detector signal for producing said control signal for operating said steering lock actuator only when said first detector signal is present and said unique code of said unique code indicative signal produced in repsonse to manual operation of said at least one of said manual switches corresponding to said steering lock actuator matches said second preset code.

6. The keyless entry system as set forth in claim 5, further comprising a second detector for detecting a steering lock condition for outputting a second detector signal when said steering lock condition is detected, and wherein said controller further receives said second detector signal for producing said control signal for operating said steering lock actuator for unlocking said steering lock mechanism when said second detector signal is present and for operating said steering lock actuator for locking said steering lock mechanism when said second detector signal is absent.

7. The keyless entry system as set forth in claim 6, wherein said manual switches includes a first switch corresponding to a door lock actuator for locking and unlocking a door lock for a door at a side of the driver's seat, said controller responsive to said manual operation of said first swtich for controlling said door lock actuator and for operating said steering lock actuator when said door lock actuator is operated for locking said door.

8. A keyless entry system for an automotive vehicle for selectively operating first and second vehicle devices, comprising:
   a portable wireless transmitter adapted to transmit a unique code indicative radio signal encoded to carry a first preset unique code stored in said transmitter and identifying said transmitter;
   a first actuator associated with said first device for operating said first device at least between a first and a second position;
   a second actuator aassociated with said second device for operating said second device at least between a first and a second position;
   a first manual switch manually operable for activating said keyless entry system and for signalling said keyless entry system to operate said first device;
   a second manual switch manually operable for activating said keyless entry system and for signalling said keyless entry system to operate said second device; and
   a controller mounted on the vehicle and responsive to manual operation of at least one of said first and second manual switches to transmit a demand signal for triggering said transmitter, and receiving said unique code indicative signal transmitted from said transmitter, said controller comparing the received unique code with a second preset code, and producing a control signal to be fed to one of said first and second actuators selectively, said controller selecting one of said first and second actuators according to input from one of said first and second manual switches being depressed.

9. A keyless entry system for an automotive vehicle for selectively operating a plurality of vehicle devices including a steering lock mechanism, comprising:

a portable wireless transmitter adapted to transmit a unique code indicative radio signal encoded to carry a first preset unique code stored in said transmitter and identifying said transmitter;

actuators, each associated with said one of said vehicle devices for operating said one of said vehicle devices at least between a first and a second position;

manual switches manually operable for activating said keyless entry system and for signalling said keyless entry system to operate at least one of said vehicle devices;

a controller mounted on the vehicle and responsive to manual operation of at least one of said manual switches to transmit a demand signal for triggering said transmitter, and receiving said unique code indicative signal transmitted from said transmitter, said controller comparing the received unique code with a second preset code, and producing a control signal to be fed to one of said actuators selectively, said controller selecting one of said first and second actuators according to input from one of said manual switches being depressed and said controller being detective of said transmitter moving away from the vehicle to be out of a given transmission range to transmit said control signal to said steering lock actuator for performing a steering locking operation.

* * * * *